United States Patent
Weber (10) Patent No.: US 12,142,416 B2
(45) Date of Patent: Nov. 12, 2024

(54) ELECTRIC MOTOR, MOTOR VEHICLE, AND METHOD FOR PRODUCING A WINDING FOR AN ELECTRIC MOTOR

(71) Applicant: AUDI AG, Ingolstadt (DE)

(72) Inventor: Korbinian Weber, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 811 days.

(21) Appl. No.: 17/287,271

(22) PCT Filed: Oct. 24, 2019

(86) PCT No.: PCT/EP2019/078998
§ 371 (c)(1),
(2) Date: Apr. 21, 2021

(87) PCT Pub. No.: WO2020/094406
PCT Pub. Date: May 14, 2020

(65) Prior Publication Data
US 2021/0391116 A1    Dec. 16, 2021

(30) Foreign Application Priority Data
Nov. 7, 2018   (DE) ..................... 10 2018 218 963.3

(51) Int. Cl.
*H01F 27/28*   (2006.01)
*H01F 27/32*   (2006.01)
(Continued)

(52) U.S. Cl.
CPC ........... *H01F 27/324* (2013.01); *H02K 1/165* (2013.01); *H02K 3/12* (2013.01); *H02K 3/28* (2013.01)

(58) Field of Classification Search
CPC ........ H01F 27/324; H02K 1/165; H02K 3/12; H02K 3/28; H02K 3/34
(Continued)

(56) References Cited

U.S. PATENT DOCUMENTS 4,716,073 A   12/1987  Randa
5,864,193 A    1/1999  Katoh
(Continued)

FOREIGN PATENT DOCUMENTS

DE         470442 A    1/1929
DE        64509 A1    11/1968
(Continued)

OTHER PUBLICATIONS

German Examination Report issued on Oct. 30, 2019 in corresponding German Application No. 10 2018 218 963.3; 24 pages; Machine translation attached.
(Continued)

*Primary Examiner* — Shawki S Ismail
*Assistant Examiner* — Kazi S Hossain
(74) *Attorney, Agent, or Firm* — Maier & Maier, PLLC (57) ABSTRACT

An electrical machine having a winding support having multiple grooves, which carries at least one winding. The winding is formed by a conductor which has multiple groove sections which each extend within one of the grooves of the winding support and which are conductively connected by connecting sections of the conductor, which are outside the grooves. The conductor has an insulation layer applied to the conductor at least in the groove sections. The insulation layer has layer thicknesses different from one another for at least two of the groove sections.

17 Claims, 4 Drawing Sheets

(51) Int. Cl.
*H02K 1/16* (2006.01)
*H02K 3/12* (2006.01)
*H02K 3/28* (2006.01)

(58) Field of Classification Search
USPC .......................................... 336/208, 83, 221
See application file for complete search history.

(56) References Cited

U.S. PATENT DOCUMENTS

| | | | | |
|---|---|---|---|---|
| 2003/0230949 | A1* | 12/2003 | Ogawa ..................... | H02K 3/12 310/180 |
| 2004/0084993 | A1 | 5/2004 | Andersson et al. | |
| 2005/0258703 | A1* | 11/2005 | Kouda ..................... | H02K 3/28 310/180 |
| 2008/0231136 | A1 | 9/2008 | Obata | |
| 2011/0285142 | A1 | 11/2011 | Groendahl et al. | |
| 2018/0152070 | A1* | 5/2018 | Sheu ........................ | H02K 3/12 |

FOREIGN PATENT DOCUMENTS

| | | |
|---|---|---|
| DE | 3718449 A1 | 12/1987 |
| DE | 102006047675 A1 | 4/2008 |
| EP | 1 381 140 A2 | 1/2004 |
| GB | 248709 A | 4/1927 |
| JP | 2015061347 A | 3/2015 |
| JP | 5984592 B2 | 9/2016 |
| KR | 20180057949 A * | 5/2018 |
| WO | 2004/075950 A2 | 9/2004 |
| WO | 2012/114181 A1 | 8/2012 |

OTHER PUBLICATIONS

International Search Report (with English translation) and Written Opinion (with Machine translation) issued on Jan. 16, 2020 in corresponding International Application No. PCT/EP2019/078998; 19 pages.

International Preliminary Report on Patentability issued on Feb. 9, 2021 in International Application No. PCT/EP2019/078998; 32 pages; English translation and partially machine translation attached.

Examination Report issued on Jun. 10, 2022 in corresponding European Application No. 19 794 517.3; 7 pages including English-language translation.

* cited by examiner

FIG. 6

ELECTRIC MOTOR, MOTOR VEHICLE, AND METHOD FOR PRODUCING A WINDING FOR AN ELECTRIC MOTOR

FIELD

The invention relates to an electrical machine having a winding support having multiple grooves, which carries at least one winding, wherein the winding is formed by a conductor which has several groove sections which each extend within one of the grooves of the winding support and which are conductively connected by connecting sections of the conductor, which are outside the grooves, wherein the conductor has an insulation layer applied to the conductor at least in the groove sections. The invention also relates to a motor vehicle and a method for producing a winding for an electrical machine.

BACKGROUND

In the meantime, a so-called hairpin design has frequently been used, particularly for drive machines in motor vehicles. In this manufacturing technique, a profile wire, usually a rectangular wire, is first bent into a U-shape, that is, into the shape of a hairpin or a "hairpin". The legs of this hairpin are then arranged in a circle and inserted into the grooves of a laminated stator core. In the next step, the free ends of the respective hairpins are rotated concentrically to the stator axis by a defined angle. For this purpose, all ends that lie on a particular diameter, that is, on a specific position in the grooves, are rotated alternately clockwise and counterclockwise. This is also known as "twisting". The adjacent ends are welded together. Depending on the winding scheme, interconnection bridges are placed on the angle head and welded to the corresponding ends of hairpins in order to interconnect the hairpins to form a complete winding. If necessary, the pin ends are then insulated and the entire stator is impregnated. This technology enables a high degree of automation and a high copper fill factor in the stator grooves, i.e., a high ratio between copper area and groove area. This type of construction is therefore often used in particular for electric motors in the automotive sector.

When a stator is produced in this way, it can be problematic that a relatively large number of crossing points occur between conductor sections of different electrical phases in the winding head. In motors having high intermediate circuit voltages, this results in a heavy stress on the electrical insulation. It can therefore be necessary to use relatively thick insulation layers, but this results in a reduction in the copper fill factor. Alternatively or additionally, an attempt can be made to further improve the high-voltage resistance of the insulation by way of special insulation materials. A large number of high-voltage-resistant insulation materials are known. Purely by way of example, reference is made in this regard to document DE 37 18 449 A1. Despite the possible improvements in the insulation by selecting a suitable insulation material, a relatively high consumption of groove area by the insulation layer still results, however.

SUMMARY

The invention is therefore based on the object of specifying an electrical machine that can achieve the required insulation of the conductors of the electrical machine from one another with less area consumption in grooves of a winding support, for example a laminated stator core.

The object is achieved according to the invention by an electrical machine of the type mentioned at the outset, wherein the insulation layer has a layer thickness that differs from one another for at least two groove sections.

In the context of the invention, it was recognized that high voltages between intersecting conductors of different phases generally only occur for relatively few turns or groove feedthroughs of the respective winding. Especially in the first turns after the phase input, voltage peaks or voltage increases are to be expected. These effects occur in many winding and interconnection schemes for electrical machines. By using different layer thicknesses for the insulation layers of different groove sections, particularly large layer thicknesses can be used only in regions in which particularly high voltages occur. As a result, the copper fill factor of the grooves can be increased overall. It was also established that, as will be explained in more detail later, the use of different layer thicknesses for the insulation layers can be implemented with little technical effort when the winding is constructed in a hairpin design.

The layer thickness of the insulation layer differs from one another for the two groove sections by at least 5% or at least 10% or at least 50%. In particular, the layer thickness of one of the groove sections is at least twice or at least 3 times as great as the layer thickness of the other groove section. Particularly preferably, multiple of the groove sections have a greater layer thickness of the insulation layer than the remaining groove sections.

The winding support can in particular be a stator body, for example a laminated stator core, or the winding can in particular be a stator winding. The winding support preferably supports multiple windings, wherein in particular each of the windings comprises groove sections having insulation layers of different thicknesses.

In particular, as will be explained in greater detail later, the conductor is composed of individual conductor sections which form the coherent conductor in the completed winding. The individual conductor sections can for example be welded to one another or otherwise conductively connected.

The insulation layer preferably extends beyond the respective groove section and at least over part of the connecting section. In particular, the insulation layer extends at least into that part of the winding head in which conductors of different windings or different phases intersect.

The sum of the cross-sectional areas of the conductor and the insulation layer in a first of the groove sections can be equal to the sum of the cross-sectional areas of the conductor and the insulation layer in a second of the groove sections in which the insulation layer has a different layer thickness than in the first groove section. In particular, this sum can be the same for all groove sections of the winding. This can be achieved for the first and second groove sections or for all groove sections by reducing the cross-sectional area of the conductor in that groove section or those groove sections in which a thicker insulation layer is used. In particular, the insulation layer can have the same external diameter in cross section for the first and second groove sections or for all groove sections. This makes it possible to improve the handling of the conductor or the conductor sections connected to form the conductor in the course of producing the winding, since exclusively the external dimensions of the insulated conductor and thus the external dimensions of the insulation layer are relevant for such handling. For example, the conductor can be formed by a rectangular wire. In this case, the sum of the width of the conductor and twice the layer thickness of the insulation layer or of the thickness of the conductor and twice the layer thickness of the insulation layer can be the same for the first and second groove sections, in particular for all groove sections of the windings.

The winding can comprise multiple interconnected conductor clamps, which each have two groove sections and a coupling section connecting the groove sections, wherein both groove sections of a first of the conductor clamps have an insulation layer having a first layer thickness and wherein both groove sections of a second of the conductor clamps have an insulation layer having a second layer thickness different from the first layer thickness. The conductor clamps can in particular be the hairpins of a plug-in coil discussed at the outset. The conductive connection can be implemented, for example, by welding or soldering the free ends of the conductor clamps.

Preferably, each of the conductor clamps has an insulation layer having essentially constant layer thickness, which extends at least over the groove sections and the coupling section. The insulation layer can preferably extend over the entire length of the conductor clamp or over the entire length except for the contact sections at the ends. Corresponding conductor clamps are easily producible by bending a wire having constant insulation thickness into the shape of the conductor clamp. Multiple first and/or multiple second conductor clamps are preferably used to form the winding.

The coupling section of the conductor clamp can form the connecting section for the two groove sections on one side. A connecting section to the next or preceding conductor clamp of the winding can be formed by the protruding free ends of the conductor clamp, which, as explained in the introduction, can be rotated and welded or otherwise conductively connected.

The first and the second conductor clamps can have the same external dimensions. In particular, the first and second conductor clamps are both bent from a respective insulated wire, wherein the insulation has the same external dimensions. For those conductor clamps for which the insulation layer has a greater layer thickness, the dimensions of the conductor can be reduced accordingly and vice versa. This enables the first and second conductor clamps to be handled jointly and in the same way, which can be advantageous in particular in the case of automatic introduction of the conductor clamps into the winding support and/or an automated connection to the winding.

The groove sections can each have either a first layer thickness or a second layer thickness. In other words, exactly two different layer thicknesses of the insulation layers can be used for all groove sections of a winding, in particular for all groove sections of all windings which are arranged on the winding support. Production-related tolerances or production-related deviations from the first layer thickness and the second layer thickness can occur. For example, the actual layer thickness of an insulation layer can differ by up to 5% or by up to 10% or by up to 20% of the difference between the first and the second layer thickness from the first or second layer thickness.

The conductor of the winding can extend from a first to a second winding terminal, wherein when counting of the groove sections along the conductor starting from the first and/or the second winding terminal, the insulation layer of at least the first and/or the second and/or the third groove section has an insulation layer, which has a greater layer thickness than the insulation layer of at least one groove section along the conductor farther away from the first and/or second winding terminal. In particular, the layer thickness of the first and/or second and/or third groove section can be greater than the layer thickness of all insulation layers of groove sections that are farther away from the first and second winding terminals along the conductor. As already mentioned, particularly high voltages between conductors of different windings or phases can potentially occur close to winding terminals. A particularly thick insulation is therefore preferably chosen in this region. For example, when counting the groove sections along the conductor, at least the first three or at least the first five or at least the first seven groove sections can have a thicker insulation than at least parts of the groove sections which are farther away from the winding terminals. For example, all of the groove sections lying adjacent to the winding terminals can have a first layer thickness and the groove sections that are farther away can have a second layer thickness.

The insulation layer can be formed by a plastic sheath of the conductor. For example, polyetheretherketone (PEEK) can be used as the material of the insulation layer. The insulation can be applied by a plastic extrusion process. Compared to a typical insulation of a conductor by a lacquer, the advantage is achieved here that the layer thickness of the insulation layer can be selected almost freely, while in the case of lacquer insulation the thickness can only be varied within a narrow range. A copper conductor, for example, can be used as the conductor.

In addition to the electrical machine according to the invention, the invention relates to a motor vehicle that comprises an electrical machine according to the invention.

Moreover, the invention relates to a method for producing a winding for an electrical machine, which comprises the following steps:

providing a winding support and multiple conductor clamps, each formed from a clamp-shaped conductor section, wherein the conductor sections have an insulation layer at least in sections, wherein the insulation layers of at least two conductor clamps have a layer thickness that is different from one another, axially inserting the conductor clamps into the winding support, and connecting free ends of a respective group of the conductor clamps to connect the conductor sections of these conductor clamps to form a conductor of a winding.

The method according to the invention thus largely corresponds to a typical procedure in order, for example, to produce a stator in a hairpin design. In a departure from the typical procedure, however, conductor clamps or hairpins are used, which have insulation layers of different thicknesses from one another. The conductor clamps having insulation layers of different thicknesses from one another can, as explained above, in particular have the same external dimensions, so that, except for supplying different conductor clamps, the same production process can be used as for producing windings in a conventional winding in hairpin design. In particular, the same machines can thus be used having the same settings.

In the case of larger series productions, it is already typical here for conductor clamps or hairpins to be produced, thus in particular bent, on multiple systems working in parallel. It is therefore not a significant additional expense to equip part of the bending systems with a differently insulated wire of the same dimensions. The following process steps remain unaffected. The method according to the invention can thus be implemented with very little technical effort.

The connection of the conductor clamps can, as explained above, be implemented by rotating or twisting the free ends of the conductor clamps and subsequently connecting them, for example by welding. After the steps explained, as explained at the outset, additional interconnection bridges can be placed on the resulting winding head and conductively connected to the ends of the conductor clamps, for example welded, in order to interconnect the conductor clamps to form a complete winding.

In the method according to the invention or in the electrical machine according to the invention, it is possible for the entire conductor of the winding to be formed by the conductor clamps explained above. Each of the conductor clamps forms two groove feedthroughs in this case. In some cases, however, it can be desirable to use individual groove feedthroughs, for example to enable contacting on an axially opposite side of the winding support or to provide a winding with an odd number of groove feedthroughs. In this case, additionally or alternatively to the conductor clamps, linear pins can be used, which in particular can also be inserted axially into the winding support and can then be connected to one another and/or to the conductor clamps in order to form the winding. It is also possible here for different ones of these linear pins to have insulation layers of different thicknesses. However, linear pins are preferably only used in the region of the winding terminals, so that they preferably have an insulation layer of the same thickness, like those conductor clamps that have the thicker insulation layers.

BRIEF DESCRIPTION OF THE FIGURES

Further advantages and details of the invention will be apparent from the following exemplary embodiments and the associated drawings. In the schematic figures.

Further advantages and details of the invention will be apparent from the following exemplary embodiments and the associated drawings. In the schematic figures.

DETAILED DESCRIPTION

Figure 1:
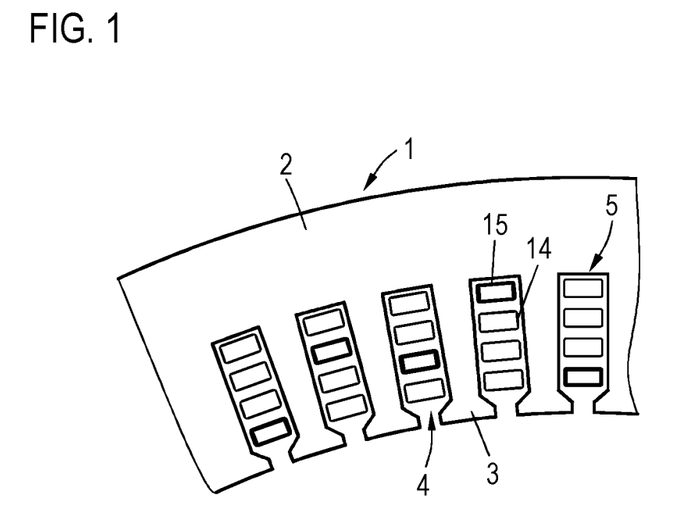
FIG. 1 shows a sectional detail view of an exemplary embodiment of an electrical machine according to the invention, the windings of which are producible by an exemplary embodiment of the method according to the invention.

FIG. 1 shows a sectional detail view of a stator 1 of an electrical machine. The stator 1 comprises a winding support 2 having teeth 3 protruding from the winding support and grooves 5 in between. The grooves 5 accommodate windings 4 of the electrical machine, which are formed by a respective conductor. Various groove sections 14, 15 of the conductor are shown in FIG. 1. As is shown schematically by the different edge thicknesses of the groove sections 14, 15, the insulation layers of these groove sections 14, 15, as will be explained in more detail later with reference to FIGS. 3 and 4, have different layer thicknesses from one another.

Figure 2:
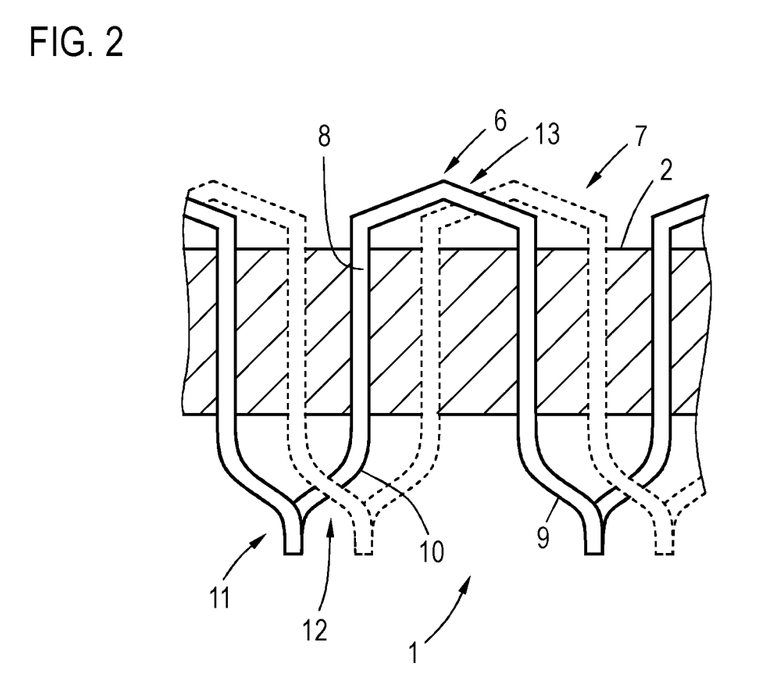
FIG. 2 shows a sectional detail view of an exemplary embodiment of an electrical machine according to the invention, the windings of which are producible by an exemplary embodiment of the method according to the invention.

As shown schematically in FIG. 2, the windings 4 are formed by multiple conductor clamps 6, 7, each of which has two groove sections 8 and a coupling section 13 connecting the groove sections 8. In FIG. 2, the conductor clamps 6 shown by solid lines form the windings of a first phase and the conductor clamps 7 shown by dashed lines form the windings of a second phase. For reasons of clarity, only two phases and only one respective winding layer are shown in FIG. 2. Windings for three phases are typically used in stators of electrical machines and it is also possible to provide multiple parallel windings for individual phases.

In the context of the production of the stator 1, the conductor clamps 6, 7 of the various phases are initially arranged in a ring and then inserted axially, that is to say in the vertical direction of FIG. 2, into the winding support 2. In this case, the free ends 9, 10 of the conductor clamps 6, 7 are initially straight, so that simple axial introduction into the winding support is possible. The individual conductor clamps 6, 7 are slightly inclined with respect to the radius of the winding support 2 here, so that, for example, the free end 10 of the conductor clamp 6 lies in a lower winding plane, i.e., farther away from the viewer in FIG. 2, than the free end 9.

In order to connect the individual conductor clamps 6, 7 to form the windings 4, the free ends 9, 10 are rotated or bent. This is also known as "twisting". Here, all free ends that lie on a certain radius are bent in the same direction. Thus, for example, the ends 10 lying in a lower winding level are bent to the left in FIG. 2 and the ends 9 lying in a higher winding level are bent to the right. Therefore, they overlap with a further free end of an adjacent conductor clamp of an adjacent winding plane in the connection region 11 and can be conductively connected to one another, in particular welded.

The procedure described corresponds to the known procedure when producing stators in a hairpin design. For this reason, it was only briefly explained above using a greatly simplified example. It is essential that the conductors of the various windings 4 intersect at a large number of intersection points 12 when the stator 1 is constructed in a hairpin design. At these intersection points, in particular in the region of the winding terminals of the individual windings, conductors having large voltage differences are led past one another close to one another. It is therefore necessary, in particular in the region of the winding terminals, to provide relatively thick insulation layers on the conductors. At a greater distance from the winding terminals, significantly lower voltages typically drop between conductors of different phases that intersect at the intersection points 12, so that insulation layers having lesser layer thicknesses can be used there. In order to achieve an optimal copper fill factor, it is advantageous, as is shown schematically in FIG. 1, to provide insulation layers having different layer thicknesses for different groove sections 8, 14, 15. This is explained in more detail below with reference to FIGS. 3 and 4.

Figure 3:
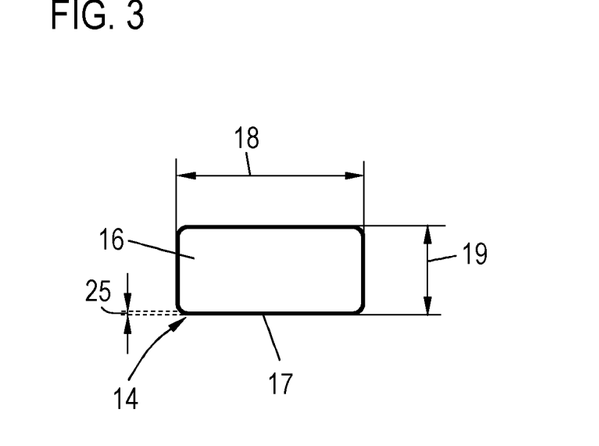
FIG. 3 shows a detail view of a conductor of a winding of the electrical machine shown in FIG. 1.
Figure 4:
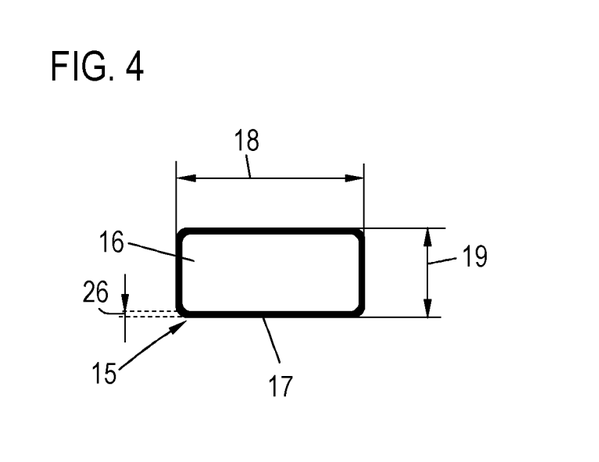
FIG. 4 shows a detail view of a conductor of a winding of the electrical machine shown in FIG. 2.

FIG. 3 shows a detail view of the groove section 14 and FIG. 4 shows a detail view of the groove section 15. Both groove sections 14, 15 are formed in that an insulation layer 17 is applied to the conductor 16. The insulation layer 17 can in particular be applied as part of a plastic extrusion process, such a process enabling the layer thickness 25, 26 of the respective insulation layer 17 to be essentially freely selected.

As can be easily seen by comparing FIGS. 3 and 4, the layer thickness 25 of the insulation layer 17 for the groove section 14 is considerably less than the layer thickness 25 of the insulation layer 17 for the groove section 15. The groove section 15 can therefore be used in particular in regions in which intersections with conductors of other phases having a large expected voltage difference are present. If no major voltage differences are expected at intersection points 12, groove sections 14 having lesser layer thickness 25 of the insulation layer 17 can be used.

Despite the different layer thicknesses 25, 26 of the insulation layers 17, the sum of the cross-sectional areas of the conductor 16 and the insulation layer 17 is the same for both groove sections 14, 15, since the total width 18 and the total height 19 of the conductor 16 having the insulation layer 17 applied to it is equal in both cases. Due to the identical dimensions 18, 19 of the conductor sections 14, 15 and thus in particular of the conductor clamps 6, 7 forming the corresponding conductor sections 14, 15, the groove sections 14, 15 or the conductor clamps 6, 7 can be easily handled in the context of automated production of the stator 1 because the same devices can be used in the same way to handle groove sections 14, 15 or conductor clamps 6, 7 having different layer thicknesses 25, 26 of the insulation layer 17.

A simple option for achieving different layer thicknesses 25, 26 of the insulation layer 17 for different groove sections 14, 15 is to use conductor clamps 6, 7, the groove sections 8 of which both have the same layer thickness 25, 26 of the insulation layer 17, wherein different layer thicknesses 25, 26 of the insulation layer 17 can be used for different conductor clamps 6, 7. The insulation layer 17 can extend essentially over the entire length of the conductor clamps 6, 7. In the region of the connections 11, this layer can either be removed in the context of the connection or the conductor clamps 6, 7 can already be provided with insulation-free ends. In this way, in particular a corresponding layer thickness 25, 26 of the insulation layer 17 is also present in the region of the intersection points 12.

Figure 5:
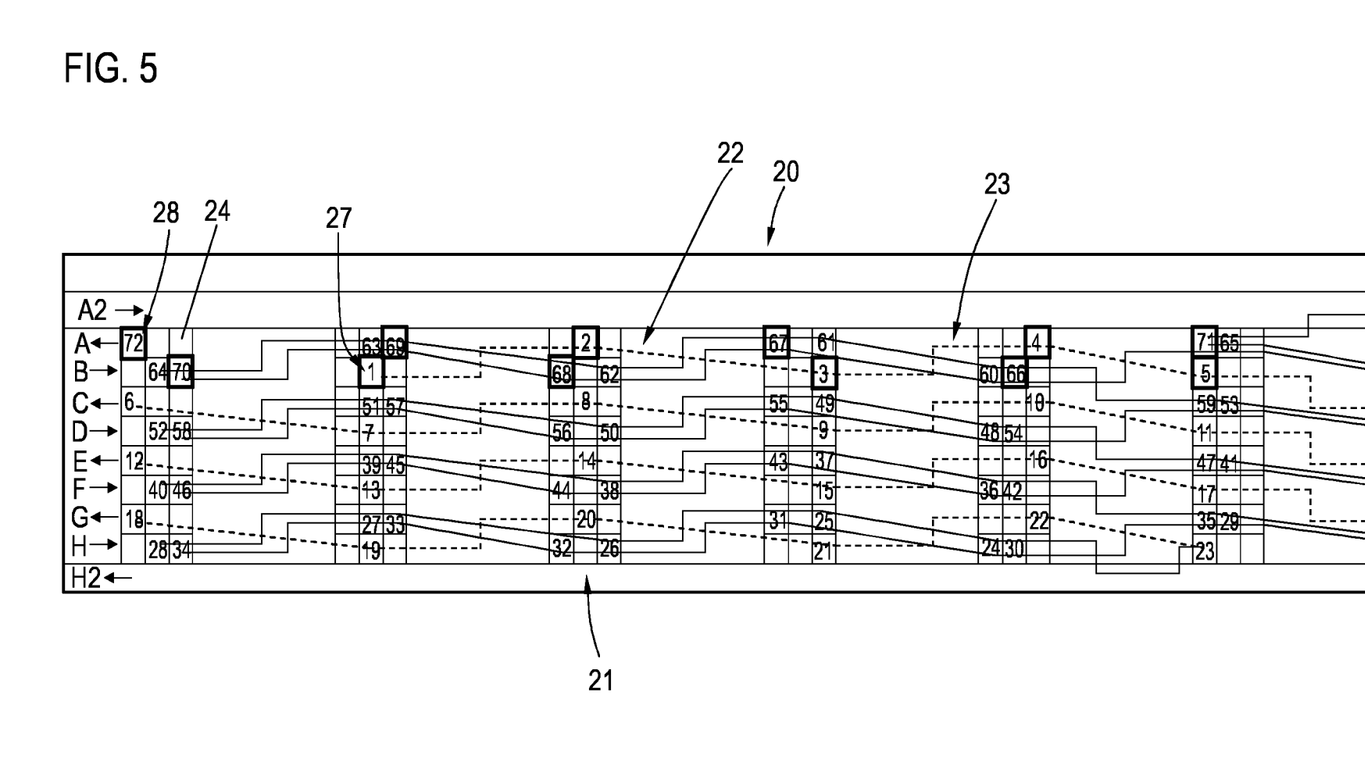
FIG. 5 shows a winding diagram for a winding of a further exemplary embodiment of an electrical machine according to the invention.

The advantages of using insulation layers having different layer thicknesses for different sections of the winding of an electrical machine are explained below with reference to FIG. 5 using a specific exemplary winding diagram. The winding diagram 20 shows the structure of a turn in a stator having a total of 52 grooves 21. The boxes 24 each mark one winding layer in each groove 21 for one phase. The grooves and winding layers for the remaining two phases are not shown in FIG. 5 for reasons of clarity. The boxes marked with the numbers 1 to 72 denote the groove sections of a winding, wherein the groove sections are counted along the conductor. The winding is thus contacted at the winding terminals 27, 28. The remaining empty boxes 24 accommodate a second winding of the same phase, which is not shown for reasons of clarity. The letters A to H denote the individual winding layers of the grooves 21. The arrows shown next to them indicate the direction in which free ends of groove sections of this winding layer are curved during twisting in order to connect them to other free ends.

The winding shown extends from box 1, which can be arranged close to the bottom of a slot, for example, first, as shown by the dashed line, to groove feedthroughs located relatively high up in the grooves, namely the box 23. From there, the winding, as shown by the solid lines, is led back to the region of the groove bottoms, namely to the box 72. The shape of the connecting lines 22, 23 shows here how the respective groove sections are connected. The obliquely extending lines 22 show a connection via a coupling section 13 of a respective conductor clamp 6, 7. The stepped lines 23 show a connection via bent ends 9, 10 of different conductor clamps 6, 7 via a connecting region 11, for example via a weld. It can be seen here that the boxes 1 and 72, that is to say the groove sections which provide the winding terminals 27, 28, are not connected to further groove sections via a coupling section 13. The corresponding groove sections can be introduced separately as pins. However, it is particularly advantageous to first use a common conductor clamp for the groove sections associated with the boxes 1, 72 and to separate their coupling section 13 after they have been introduced into the winding support 2.

As already explained above, high voltages between the intersecting conductors are to be expected in particular at intersection points 12 at which conductors of different phases intersect if these intersection points 12 are relatively close to the winding terminals 27, 28 for at least one of these conductors along the corresponding conductor. The conductor should therefore have a thicker insulation for a certain length starting from these winding terminals 27, 28, as is shown in FIG. 5 by the thicker edges of the boxes 1 to 5 and 66 to 72. This can be implemented relatively easily in that, as explained above, conductor clamps 6, 7 are used having insulation layers of different thicknesses, which, however, preferably have the same external dimensions. Such conductor clamps having a thicker insulation layer can be used for the box pairs 2 and 3, 4 and 5, 70 and 71, 68 and 69, and 66 and 67. In addition, such a conductor clamp can be used for the box pair 1 and 72 and the coupling section 13 of these conductor clamps 6, 7 can then be separated, as has been explained above. For the remaining groove sections or the boxes 6 to 65, in contrast, conductor clamps 6, 7 having a thinner insulation layer 17 can be used in order to achieve a high copper fill factor of the grooves 5 overall.

Figure 6:
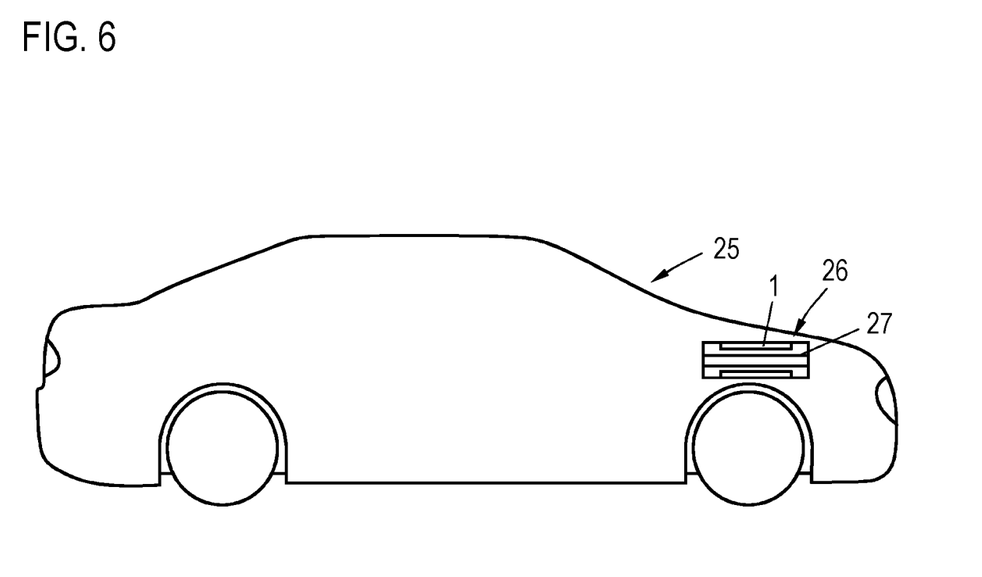
FIG. 6 shows an exemplary embodiment of a motor vehicle according to the invention.

Because of the achievable high fill factors for grooves and because of the potentially usable higher voltages, the procedure described is relevant in particular when using electrical machines 26 in motor vehicles 25, as is shown in FIG. 6. The electrical machine 26 here has a rotor 27 and the stator 1 already discussed above. The electrical machine 26 can be used, for example, to drive the motor vehicle 25. The procedure described makes it possible to achieve high power densities with a compact design of the electrical machine 26.

The invention claimed is:

1. An electrical machine having a winding support having multiple grooves, which carries at least one winding, wherein the winding is formed by a conductor which has multiple groove sections which each extend within one of the grooves of the winding support and which are conductively connected by connecting sections of the conductor which are outside the grooves, wherein the winding comprises multiple conductor clamps which are conductively connected to one another and which each form two groove sections and a coupling section connecting the groove sections, wherein the individual conductor clamps are inclined with respect to the radius of the winding support in such a way that a first free end of the respective conductor clamp lies in a lower winding level than a second free end of the conductor clamp, wherein the conductor has an insulation layer applied to the conductor at least individually on each one of the groove sections, wherein the insulation layer has layer thicknesses different from one another for at least two of the groove sections within a same one of the grooves of the winding support, wherein both groove sections of a first of the conductor clamps have an insulation layer having a first layer thickness and wherein both groove sections of a second of the conductor clamps have an insulation layer having a second layer thickness different from the first layer thickness.

2. The electrical machine according to claim 1, wherein the sum of the cross-sectional areas of the conductor and the insulation layer in a first of the groove sections is equal to the sum of the cross-sectional areas of the conductor and the insulation layer in a second of the groove sections in which the insulation layer has a different layer thickness than in the first groove section.

3. The electrical machine according to claim 1, wherein the first and second conductor clamps have the same external dimensions.

4. The electrical machine according to claim 1, wherein the groove sections each have either a first layer thickness or a second layer thickness.

5. The electrical machine according to claim 1, wherein the conductor of the winding extends from a first to a second winding terminal, wherein when counting the groove sections along the conductor starting from the first and/or the second winding terminal, the insulation layer of at least the first and/or the second and/or the third groove section has an insulation layer, which has a greater layer thickness than the insulation layer of at least one groove section along the conductor farther away from the first and/or second winding terminal.

6. The electrical machine according to claim 1, wherein the insulation layer is formed by a plastic sheath of the conductor.

7. A motor vehicle, comprising an electrical machine according to claim 1.

8. The electrical machine according to claim 2, wherein the first and second conductor clamps have the same external dimensions.

9. The electrical machine according to claim 2, wherein the groove sections each have either a first layer thickness or a second layer thickness.

10. The electrical machine according to claim 3, wherein the groove sections each have either a first layer thickness or a second layer thickness.

11. The electrical machine according to claim 2, wherein the conductor of the winding extends from a first to a second winding terminal, wherein when counting the groove sections along the conductor starting from the first and/or the second winding terminal, the insulation layer of at least the first and/or the second and/or the third groove section has an insulation layer, which has a greater layer thickness than the insulation layer of at least one groove section along the conductor farther away from the first and/or second winding terminal.

12. The electrical machine according to claim 3, wherein the conductor of the winding extends from a first to a second winding terminal, wherein when counting the groove sections along the conductor starting from the first and/or the second winding terminal, the insulation layer of at least the first and/or the second and/or the third groove section has an insulation layer, which has a greater layer thickness than the insulation layer of at least one groove section along the conductor farther away from the first and/or second winding terminal.

13. The electrical machine according to claim 4, wherein the conductor of the winding extends from a first to a second winding terminal, wherein when counting the groove sections along the conductor starting from the first and/or the second winding terminal, the insulation layer of at least the first and/or the second and/or the third groove section has an insulation layer, which has a greater layer thickness than the insulation layer of at least one groove section along the conductor farther away from the first and/or second winding terminal.

14. The electrical machine according to claim 2, wherein the insulation layer is formed by a plastic sheath of the conductor.

15. The electrical machine according to claim 3, wherein the insulation layer is formed by a plastic sheath of the conductor.

16. The electrical machine according to claim 4, wherein the insulation layer is formed by a plastic sheath of the conductor.

17. The electrical machine according to claim 5, wherein the insulation layer is formed by a plastic sheath of the conductor.

* * * * *